April 26, 1955
J. R. THOMAS
2,707,037
MEANS TO FACILITATE SHIFTING GEARS OF TRANSMISSIONS
DRIVEN BY HYDRAULIC CLUTCHES
Filed June 19, 1952
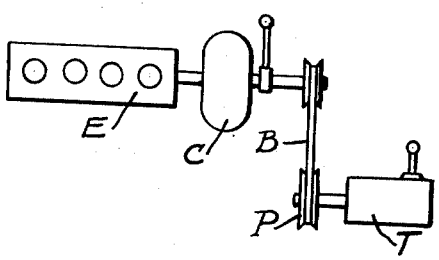
Fig.1
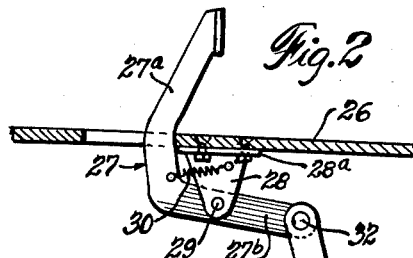
Fig.2
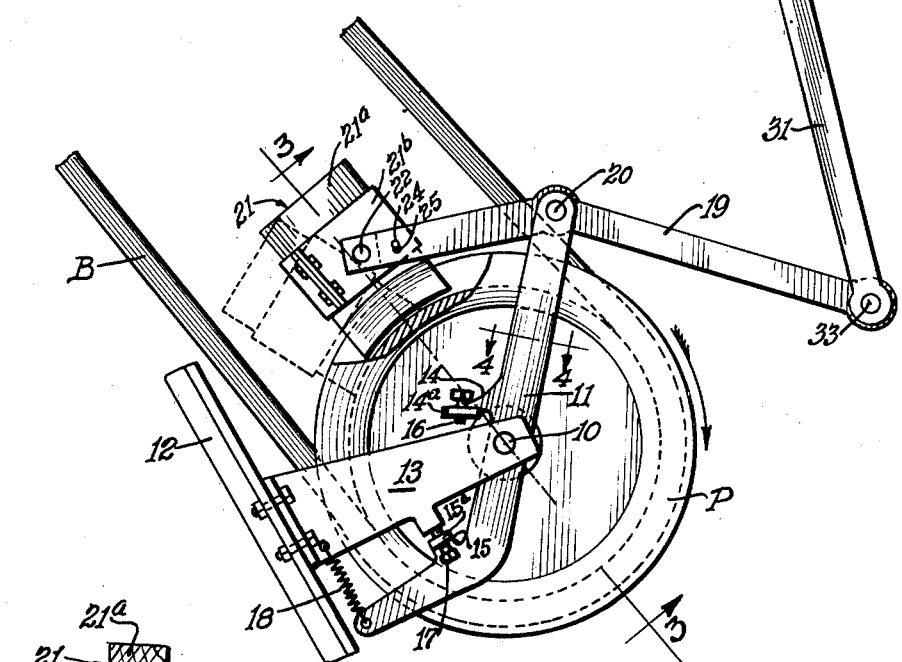
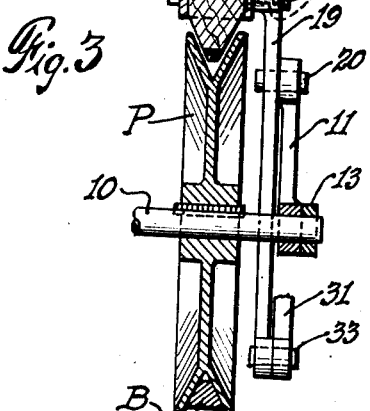
Fig.3
Fig.4
Inventor:
John R. Thomas
By Frank J. Schrader Jr.
Attorney

United States Patent Office 2,707,037
Patented Apr. 26, 1955

2,707,037

MEANS TO FACILITATE SHIFTING GEARS OF TRANSMISSIONS DRIVEN BY HYDRAULIC CLUTCHES

John R. Thomas, Wichita, Kans., assignor to Thomas Hydraulic Speed Controls, Inc., Wichita, Kans., a corporation of Kansas Application June 19, 1952, Serial No. 294,369

11 Claims. (Cl. 192—4)

This invention relates to means for facilitating the shifting of gears in transmissions driven by hydraulic clutches of the type disclosed in my Patents Nos. 2,526,914 and 2,531,014 wherein two fluids of different resistant values, such as air and oil, are employed independently as well as in mixtures of relatively varied proportions.

Because it is common practice to interpose a variable speed transmitting hydraulic clutch between the prime mover and an ordinary transmission of the shiftable gear type, the operator sometimes encounters a condition that makes his work more difficult than should be the case. Namely, whenever a hydraulic clutch of the above stated type is idling with only air circulating through the gear pump while the gears in the transmission remain in mesh, a comparatively strong force is needed to overcome the residual drag in the clutch when shifting the transmission gears. This is due to the fact that, with the clutch in such idling operation, without transmitting any appreciable rotary output power, it is, in the above types of hydraulic clutches still pumping air and, therefore, exerting some torque or turning force on the output shaft. This force, though small and insufficient to operate the transmission, is sufficient to press the teeth of the meshed transmission gears together so tightly that undue frictional resistance to shifting must be overcome.

The object of the present invention is to provide simple and novel means for relieving transmission mechanisms, deriving power from a hydraulic clutch, of undesirable frictional resistance imparted to the gear train by the small torque transmitted by the output shaft of the clutch while the clutch is in such idling operation.

In a more specific aspect, the present invention may be said to have for its object to provide a simple and novel means for neutralizing the torque transmitted to a shiftable gear mechanism by the output shaft of a hydraulic clutch, while the latter is in such idling operation, to facilitate shifting the gears.

In carrying out my invention I employ a device including a brake, preferably a brake shoe, that is normally held in an idle position but which may be shifted at will to engage either the output shaft of the clutch or preferably the input shaft of the transmission, or some rotatable element connected with either of those shafts, in the manner of a brake shoe, and then be moved in the direction to turn the shaft, or the rotatable element, backward through a small angle. Thus, the small torque transmitted by the idling clutch to the transmission is neutralized to remove the pressure exerted between the meshed transmission gear teeth to substantially lessen the force required to shift the transmission gears.

The various features of novelty whereby the present invention is characterized will hereinafter be pointed out with particularity in the claims; but, for a full understanding of the invention and of its objects and advantages, reference may be had to the following detailed description, taken in connection with the accompanying drawing, wherein:

Figure 1 is a diagram illustrative of an engine, a transmission and a hydraulic clutch interposed between them.

Fig. 2 is an elevational view of mechanism embodying the present invention applied to the pulley or sheave that drives the transmission, together with fragments of parts of a motor-driven vehicle on which the device or mechanism is mounted.

Fig. 3 is a section on line 3—3 of Fig. 2, showing details of the transmission drive sheave, brake and connecting elements.

Fig. 4 is a section on line 4—4 of Fig. 2.

As illustrated in the drawing, the invention may be considered as applied, for exemplary purposes, to a motor-driven vehicle such as, for example, a self-propelled harvesting combine employing a hydraulic clutch interposed between the engine and the transmission.

In the diagram, Fig. 1 of the drawing, E represents an engine and T a transmission of the conventional shiftable gear type. Power is delivered to the transmission from the engine through a variable speed hydraulic clutch C of the above-mentioned type; the output shaft of the clutch C driving a belt B which runs over a pulley P on the input shaft of the transmission T.

All of the aforesaid structures may take any usual or suitable form. It may be noted, however, that the clutch, to which the invention is particularly directed, is of the general type disclosed in Patents 2,526,914 and 2,531,014.

In the specific embodiment of my invention as illustrated in Figs. 2, 3 and 4 of the drawing, an arm 11 is pivotally mounted on the input shaft 10 of the transmission near one side of pulley P and is free to oscillate on the shaft 10 independently of the pulley P. The arm 11 extends both upwardly and downwardly from the shaft 10. Fixed to any convenient stationary part of the vehicle, as, for example, an angle iron strut 12 of the combine, is a bracket 13 which serves as a support for the pulley-end of shaft 10. Projecting from one edge of arm 11 are two fingers, 14 and 15 which have at their free ends ears 14$^a$ and 15$^a$, respectively; the ears extending laterally past the bracket 13 as illustrated by ear 14$^a$ shown in Fig. 4, one ear 14$^a$ being above and the other ear 15$^a$ below the bracket 13. Set screws 16 and 17 extend through the respective ears in the plane of the bracket 13 and serve as adjustable stops for limiting the swinging movements of the arm 11 about the axis of the shaft 10. A spring 18 connects the lower angular portion of arm 11 to the bracket 13 near the base of the latter, and yieldingly normally holds the bar 11 in the position wherein the lower set screw 17 engages the bracket 13. Therefore the arm 11 normally occupies a position from which it can only move in a counter-clockwise direction as viewed in Fig. 2, that is, in the opposite direction from that indicated by the arrow in which the pulley P turns in driving the transmission.

On the upper end of arm 11 is mounted a lever 19, pivotally connected at a point between its ends to the arm 11 by a pin 20, so as to lie near the periphery of the pulley P. On one end of the lever 19 on the same side of the arm 11 as the bracket, is a brake shoe which as a whole is designated by the reference numeral 21 and which preferably consists of a wood block 21$^a$ held in a clamp band 21$^b$; the lower end of the block 21$^a$ being V-shaped to fit into a V-grove in the pulley P, without bottoming in the groove. The shoe 21 is pivotally carried on one end of the lever 19 on a bolt 22 which passes through the lever 19 and through the shoe 21 preferably a slight distance toward the right from the longitudinal center-line thereof as viewed in Fig. 2. The shoe 21 may be rocked into and out of engagement with the pulley P by the lever 19 and it may also rock on the pivot bolt 22 in a manner to fit frictionally within the V-groove of the pulley P when in pulley-engaging position. In order to limit the rocking movements of the shoe 21 relatively to the lever 19 which supports it, there is provided a pin 24 that projects from the band 21$^b$ into a short arcuate slot 25 in the lever 19 a short distance toward the right from bolt 22.

The shoe 21 is preferably pivoted off center so that the greater weight of its left portion, augmented by the flanges and bolts of its band 21$^b$, tends to swing the shoe 21 about its pivot 22 in a counter-clockwise direction which swinging movement is limited by the engagement of the pin 24 within the uppermost end of slot 25 whereat in this position the longitudinal center-line of the brake block 21ᵃ and of the arcuate face of its pulley-engaging portion intersects the center of the shaft 10. The slot 25 is long enough to permit the shoe 21 to adjust itself relatively to the lever 19 when in braking action.

Extending through the floor or platform 26, on which the operator of the vehicle takes his place, is the upright arm portion 27ᵃ of an L-shaped pedal 27. On the under side of the floor or platform is fixed a bracket 28 to which the more or less horizontal arm portion 27ᵇ of the pedal is connected, at a point between its ends, by a pivot pin 29. The bracket 28 has a base flange 28ᵃ against which the upright arm portion of the pedal bears when the parts are in their normal positions. A spring 30, connecting the pedal and the bracket 28 together, normally holds the upright arm portion 27ᵃ against the near edge of flange 28ᵃ.

The terminal end of the pedal arm portion 27ᵇ is pivotally connected to the upper end of a link 31 by a pin 32; the lower end of the link 31 being in turn pivotally connected to the second end of lever 19 by a pin 33.

The parts normally occupy the positions shown in full lines in Fig. 2; the brake shoe 21 being out of engagement with the pulley P and the arm 11 engaging with its adjustable set screw stop 17 the bracket 13.

If the operator now actuates the pedal 27, the initial portion of its movement first rocks the lever 19 in the direction to frictionally engage the shoe with the pulley; this initial movement having no effect on arm 11 which remains in its position of rest, however, as soon as the shoe is firmly frictionally seated in the V-groove of the pulley, the lever 19 is at the limit of its rocking movement relative to arm 11 and continued movement of the pedal can take place only when accompanied by a movement of the arm 11. It will thus be seen that the shoe, pivot pin 20 and shaft 10 are at the three corners of a triangle of which a radius of the pulley, and portions of the lever 19 and arm 11 form the sides. Therefore, any further movement of the pedal, in the same direction as before, must result in a reverse angular movement of the pulley P. This reverse movement may proceed until set screw 16 strikes bracket 13 which occurs when the shoe 21 has moved from the full line position in Fig. 2 to about the broken line position, namely, through a small angle only. The extent of this reverse movement or "roll back" of the pulley P can be regulated very accurately through adjustment of the set screws 16 and 17.

Assuming that clutch has been shifted to idling operation without first having brought the transmission into neutral, the small torque that is still being imposed by the clutch on the pulley, although insufficient to rotate the pulley, tends to turn the latter in the clockwise direction as viewed in Fig. 2. This torque is sufficient to cause meshed gear teeth of the transmission to be so pressed together with such force that frictional resistance to gear shifting is encountered. When the device embodying my invention has been installed, the operator needs only to press the pedal member thereof at the same time or just a little prior to the time he starts to operate the gear shifting lever in order to shift from one speed to the other with ease.

It will be seen that there are two successive stages in the operation of overcoming the undesirable frictional resistance to the shifting of the meshed gears resultant from the small torque being transmitted to shaft 10. As soon as the brake shoe is actuated by the pedal 27 and pressed firmly against the pulley P the small torque to which the pulley has been subjected by the clutch is neutralized. Then, upon further movement of the pedal, the pulley is actually turned a small angle in reverse and the gear teeth, that were being firmly pressed together, are relieved of the small imposed force and their shifting is made with ease.

While I have illustrated and described with particularity only a single preferred form of my invention, I do not desire to be limited to the details thus illustrated and described; but intend to cover all forms and arrangements that come within the scope of the definitions constituting the appended claims.

I claim:

1. In a drive mechanism comprising a hydraulic clutch that delivers a slight torque while in idling operation, a variable speed transmission and a driving connection, including a rotatable member, between the clutch and the transmission: the improvement consisting of an elongated supporting arm pivotally mounted on the input shaft of the transmission adjacent to said rotatable member and movable from an idle position within an acute angular distance in the reverse direction from that in which said rotatable member is normally driven by the clutch, means yieldingly holding said supporting arm in its said idle position, a lever pivotally mounted at a point between its ends on one end of said supporting arm, a brake shoe pivotally carried on one end of said lever, and a device connected to the other end of said lever adapted to rock said lever and move said shoe into frictional engagement with said rotatable member and thereafter move said shoe and said lever and said supporting arm in unison in the direction to turn said rotatable member backward, with said shoe in frictional contact with said rotatable member while rotating the latter through a small angle.

2. The combination as set forth in claim 1 including a spring connected to said device, that operates said pivoted lever, tending constantly to hold said device in a position that permits said supporting arm to remain in its idle position and said shoe clear of said rotatable member.

3. The combination with a belt-driven pulley mounted on a shaft driving a transmission, of a brake shoe adapted to be moved into and out of braking engagement with the periphery of said pulley, mechanism supporting said shoe in an idle position or in a braking position, and means to operate said mechanism to move said shoe into its braking position and thereafter cause said shoe to move angularly of the axis of said pulley and thereby turn said pulley through a small angle in a direction reverse to that in which said pulley turns in driving the transmission.

4. A combination as set forth in claim 3, wherein the mechanism that supports the brake shoe includes resilient means for yieldingly retaining the brake shoe in its idle position, and a pedal adapted to actuate the shoe-supporting mechanism in opposition to the force exerted by said resilient means when the pedal is depressed to thereby move said brake shoe into operative engagement with said pulley.

5. The combination with a rotatable member that turns in one direction to drive a transmission, of a supporting arm movable angularly about the axis of said rotatable member, two stops to limit the range of movements of said arm, a lever pivotally mounted at a point between its ends on said arm, a brake shoe on one end of said lever in position to move into and out of braking engagement with said rotatable member through rocking movements of said lever, an actuator movable between two positions, a connection between the actuator and the opposite end of said lever, said arm, lever and shoe being so disposed that when the actuator is in its first position the said arm is in engagement with one of said stops at one limit of its angular movement about the axis of said rotatable member with the shoe clear of the latter, and resilient means tending normally to hold said actuator and said arm and shoe in their last named positions, said actuator being movable into its second position with said arm into engagement with the other one of said stops whereby said shoe is first brought into braking engagement with said rotatable member and, thereafter, the shoe, said arm and said rotatable member are caused to move in unison about the axis of said rotatable member to thereby move said rotatable member the limit of the range of the movement of said arm in a direction reverse to its normal rotation when driving said transmission.

6. The combination with a hydraulic clutch of the type that delivers a slight torque while in idling operation, a variable speed transmission and a driving connection, including a pulley, between the clutch and the transmission: of a supporting arm beside and mounted for angular movements about the axis of and relative to said pulley, adjustable stops limiting the range of movements of said arm to a small angle from and to an idle position, resilient means yieldingly holding said arm in the idle position, a lever pivotally mounted on one end of said arm at a point remote from both ends of said lever, a shoe on one end of said lever in position to move into and out of engagement with the periphery of said pulley when said lever is rocked, a pedal movable in the same direction into two successive positions, a link connecting said pedal to the other end of said lever, said shoe being normally held clear of said pulley and when said pedal is moved into the first of its said positions said shoe is brought into frictional engagement with said pulley and upon further movement of said pedal into its second position said arm, lever and shoe are caused to move in unison about the axis of said pulley while said shoe is in frictional engagement with said pulley whereby said pulley is rotated less than an acute angle in a direction reverse to its normal rotation when driven by said pulley to thereby counteract and neutralize the force of the slight torque transmitted by the clutch to the transmission while said clutch is in idling operation to facilitate shifting of the transmission gears.

7. The combination as set forth in claim 6 wherein said shoe is carried on said end of said lever on a pivot disposed to one side of the longitudinal center-line of said shoe that intersects the axis of said rotatable member.

8. The combination as set forth in claim 7, and including a short arcuate slot within the end of said lever formed on a short radius from the center of said pivot, and a pin carried by said shoe extending into said slot and normally maintained in one end of said slot by the unbalanced pivotal mounting of said shoe on the end of said lever.

9. The combination with a hydraulic clutch of the type that delivers a slight output torque while in idling operation, a variable speed transmission and a driving connection therefor including a rotatable member interposed between said clutch and said transmission: of a brake shoe, mechanism including a lever pivotally supported intermediate its ends on a pin carried on one end of an arm that is pivotally carried on the input shaft of the transmission, said shoe being pivotally carried on one end of said lever and said lever being pivotally interconnected with said arm by said pin whereby said shoe is initially movable into frictional engagement with said rotatable member and thereafter upon further movement causes said rotatable member to be rotated through an acute angle in a direction reverse to its normal rotation when driven by the clutch, and adjustable stops carried by said arm for selectively variably limiting the angular range of the angle of reverse movement of said rotatable member.

10. The combination with a gear type transmission and a hydraulic-clutch-driven rotatable member that turns in one direction when driving said transmission, of a brake shoe, and mechanism adapted for operation while said clutch is in idling operation for imparting a compound movement to said brake shoe consisting of an initial movement to cause said brake shoe to frictionally engage said rotatable member, said initial movement of said brake shoe being movable in an arc having a radial center noncoincident with the axis of rotation of said rotatable member, said brake shoe being thereafter additionally movable, while still in engagement with said rotatable member, in an arc having a radial center different from said first-mentioned radial center to thereby rotate said rotatable member through a limited angle in a direction reverse to its normal rotation when driven by the clutch.

11. The combination with a gear type transmission as set forth in claim 10 wherein said additional movement of said shoe in an arc having a radial center different from said first-mentioned radial center is coincident with the center of the axis of rotation of said rotatable member.

References Cited in the file of this patent

UNITED STATES PATENTS

| | | |
|---|---|---|
| 1,579,549 | Logan | Apr. 6, 1926 |
| 1,802,434 | Long et al. | Apr. 28, 1931 |
| 1,978,172 | Sinclair | Oct. 23, 1934 |
| 2,247,714 | Peterson et al. | July 1, 1941 |
| 2,294,994 | Maze | Sept. 8, 1942 |
| 2,433,003 | Swennes | Dec. 23, 1947 |
| 2,475,679 | Sinclair | July 12, 1949 |
| 2,451,625 | Webster | Feb. 13, 1951 |